(12) United States Patent
Nakamura et al.

(10) Patent No.: US 7,761,322 B2
(45) Date of Patent: Jul. 20, 2010

(54) CONTENT DISPLAY METHOD, A CONTENT DISPLAY APPARATUS, AND A RECORDING MEDIUM ON WHICH A CONTENT DISPLAY PROGRAM IS RECORDED

(75) Inventors: Takatoshi Nakamura, Ibaraki (JP); Yoichiro Sako, Tokyo (JP); Itaru Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/002,563

(22) Filed: Dec. 18, 2007

(65) Prior Publication Data
US 2008/0175103 A1 Jul. 24, 2008

(30) Foreign Application Priority Data
Dec. 28, 2006 (JP) .............................. 2006-353768

(51) Int. Cl.
*G05B 19/418* (2006.01)
(52) U.S. Cl. ............................ 705/8; 715/963; 708/112; 368/29
(58) Field of Classification Search ............. 368/28–30; 705/8–9; 715/764, 963; 707/104.1; 345/418; 708/112
See application file for complete search history.

(56) References Cited
U.S. PATENT DOCUMENTS
6,714,932 B1 * 3/2004 Takeda et al. ..................... 1/1

| 7,392,041 B2 * | 6/2008 | Brush et al. ............... 455/414.1 |
| 2004/0113928 A1 | 6/2004 | Kobayashi et al. |
| 2007/0011152 A1 * | 1/2007 | Ikezawa ........................ 707/4 |
| 2008/0040072 A1 * | 2/2008 | Anderson ................... 702/178 |

FOREIGN PATENT DOCUMENTS

| CN | 1288574 C | 12/2006 |
| JP | 11-232228 | 8/1999 |
| JP | 2001-197291 A | 7/2001 |
| JP | 2004-046317 A | 2/2004 |
| JP | 2005-148935 A | 6/2005 |

\* cited by examiner

*Primary Examiner*—Edwin A. Leon
(74) *Attorney, Agent, or Firm*—Wolf, Greenfield & Sacks, P.C.

(57) ABSTRACT

A content display method is disclosed. The content display method includes the steps of: accepting an instruction input to create a target calendar; extracting a content that indication information has to be displayed in an elapsed period having already passed and a content that indication information has to be displayed in a non-elapsed period to pass from now on in the target calendar based on the instruction input accepted through the accepting step; and arranging the indication information of each of the contents extracted in the extracting step in a corresponding date in a target calendar and displaying the target calendar on a display device.

10 Claims, 12 Drawing Sheets

EVENT: FIELD DAY

| 9 September | | | | | | 2006 |
|---|---|---|---|---|---|---|
| Sun | Mon | Tue | Wed | Thu | Fri | Sat |
| | | | | | 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 ▓ |
| 24 ▓ | 25 | 26 | 27 | 28 | 29 | 30 |

FIG. 10B

EVENT: FIELD DAY

| 10 October | | | | | | 2006 |
|---|---|---|---|---|---|---|
| Sun | Mon | Tue | Wed | Thu | Fri | Sat |
| 1 ▓ | 2 | 3 | 4 | 5 | 6 | 7 |
| 8 ▓ | 9 ▓ | 10 ▓ | 11 | 12 | 13 | 14 |
| 15 ▓ | 16 | 17 | 18 | 19 | 20 | 21 |
| 22 | 23 | 24 | 25 | 26 | 27 | 28 |
| 29 | 30 | 31 | | | | |

FIG. 11A

EVENT: FIREWORKS

| 7 July | | | | | | 2006 |
|---|---|---|---|---|---|---|
| Sun | Mon | Tue | Wed | Thu | Fri | Sat |
|  |  |  |  |  |  | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 ▨ | 22 ▨ |
| 23/30 | 24/31 | 25 | 26 | 27 | 28 | 29 ▨ |

FIG. 11B

EVENT: FIREWORKS

| 8 August | | | | | | 2006 |
|---|---|---|---|---|---|---|
| Sun | Mon | Tue | Wed | Thu | Fri | Sat |
|  |  | 1 ▨ | 2 | 3 | 4 | 5 ▨ |
| 6 ▨ | 7 | 8 | 9 | 10 | 11 | 12 ▨ |
| 13 | 14 | 15 ▨ | 16 | 17 | 18 | 19 |
| 20 | 21 | 22 | 23 | 24 | 25 | 26 |
| 27 | 28 | 29 | 30 | 31 |  |  |

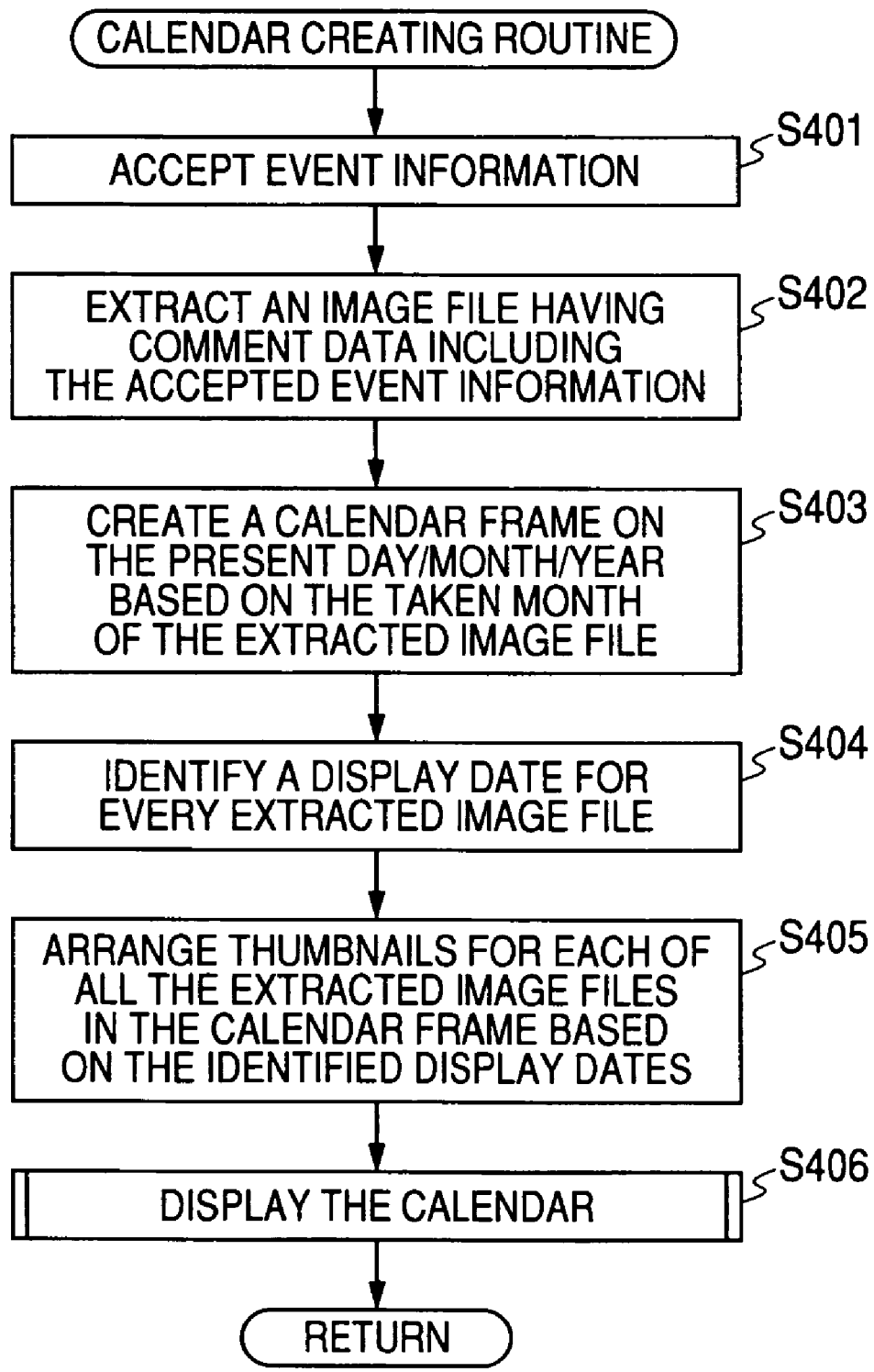

CONTENT DISPLAY METHOD, A CONTENT DISPLAY APPARATUS, AND A RECORDING MEDIUM ON WHICH A CONTENT DISPLAY PROGRAM IS RECORDED

CROSS REFERENCES TO RELATED APPLICATIONS

The present invention contains subject matter related to Japanese Patent Application JP 2006-353768 filed in the Japanese Patent Office on Dec. 28, 2006, the entire contents of which being incorporated herein by reference.

BACKGROUND OF THE INVENTION

1. Field of the Invention

The present invention relates to a method, an apparatus, and a recording medium on which a program is recorded, in which for contents stored in an information processing apparatus such as a personal computer and a portable information terminal, indication information of the contents is displayed to allow contents to be used.

2. Description of the Related Art

Various personal information processing terminals are widely used, including a personal computer, a portable information terminal called PDA (Personal Digital Assistants), an electronic organizer, a mobile telephone terminal, and a game machine. Many of these information processing terminals have a so-called calendar function mounted thereon, which indicates a year, month, week, day and a day of the week. This calendar function is used to implement functions that manage data in the past and manage a schedule, and new functions are also considered.

For example, JP-A-2005-148935 (Patent Reference 1) discloses a technique on a diary electronically opened in which days on which the diary is written are distinguished from days on which the diary is not written and the days are displayed on a calendar screen. With the use of the technique described in the Patent Reference 1, it is unnecessary to confirm the days on which the diary is written day by day, the days on which the diary is written are identified accurately and quickly, and the diary efficiently opened can be read.

In addition, JP-A-2004-46317 (Patent Reference 2) discloses a technique in which based on date information in file data generated by an information processing apparatus by itself, the file data is associated with the date of the date information and displayed on a calendar. With the use of the technique described in Patent Reference 2, information indicating when the past file data was generated can be reliably and accurately grasped by the display of a calendar.

In addition, JP-A-H11-232228 (Patent Reference 3) discloses a technique in which a message and a schedule having been inputted by indication information such as text on a calendar before is inputted by speech and the message and the schedule by speech can be reproduced and listened any time. By the technique described in Patent Reference 3, messages and schedules stored on a calendar can be confirmed by speech.

SUMMARY OF THE INVENTION

The technique described in Patent Reference 3 has an important meaning that information relating to the future after the present day is mainly managed, but in the technique, information about inputted messages and schedules are kept to use the information as schedule history in the past. On the other hand Patent Reference 1 and Patent Reference 2 are techniques in which a calendar is used to manage information (contents) in the past which has been formed before the present time.

FIG. 13 shows a diagram illustrative of an embodiment of a content management scheme before in which a calendar function is used to manage contents such as still image data obtained in the past. FIG. 13 shows an example in which a calendar in August 2006 is displayed in which the present date is on Aug. 15, 2006.

As shown in FIG. 13, in the case of the content management scheme before using a calendar, for example, for still image data acquired by taking an image by a digital camera, information relating to the content (when the content is still image data, its thumbnail image) is displayed on the display of the calendar based on a date and time associated with the content such as a taken date (date information).

In the example shown in FIG. 13, it is shown that there are already acquired contents on Tue. Aug. 1, 2006 to Fri. Aug. 4, 2006, August 7 to 11, and Aug. 14, 2006. However, in the future dates after the present day, nothing is displayed because contents do not exist yet. In other words, in FIG. 13, in the display sections of future dates from August 16 to August 31 after August 15 surrounded by a dotted line, nothing is displayed.

As described above, in the case of the content management scheme before using a calendar, an old calendar (a calendar in the past) is reviewed to retrieve old contents. In other words, the content management scheme before using a calendar is superior in the search and management of past data. However, the primary purpose of a calendar is to see today and new months and days later (write schedules). On this point, this runs counter to the purpose (function) of a calendar in the content management scheme before using a calendar.

Thus, it is desirable to effectively utilize the area of the future dates in a calendar as well and to allow the contents acquired in the past to be effectively used.

According to an embodiment of the invention, there is provided a content display method including the steps of: accepting an instruction input to create a target calendar; extracting a content that indication information has to be displayed in an elapsed period having already passed and a content that indication information has to be displayed in a non-elapsed period to pass from now on in the target calendar based on the instruction input accepted through the accepting step; and arranging the indication information of each of the contents extracted in the extracting step in a corresponding date in a target calendar and displaying the target calendar on a display device.

In accordance with the content display method according to an embodiment of the invention, based on the instruction input to create the target calendar accepted through the accepting step, the content that indication information such as a thumbnail is displayed in the elapsed period and the content that indication information such as a thumbnail is displayed in the non-elapsed period are extracted in the extracting step. In the displaying step, the indication information of each of the contents extracted in the extracting step is arranged in the calendar, and then the calendar is displayed on a display device.

Accordingly, in the elapsed period and the non-elapsed period in the calendar, indication information such as a thumbnail about the content can be displayed. Therefore, even the display area in the non-elapsed period, in which nothing is displayed before, can be used to display indication information of the content and the content can be utilized.

In addition, a content display method according to an embodiment of the invention is the content display method described above, wherein in the accepting step, in order to create a calendar for a target period, an input of information to specify the period is accepted as the instruction input; in the extracting step, for each of contents stored and held, when a predetermined item of date information owned by a content belongs within the calendar for the target period, the date information is identified as display date information, whereas when a predetermined item of date information owned by a content does not belong within the calendar for the target period, date information generated by a predetermined computation using the date information is identified as the display date information, and based on the identified display date information, a content having display date information belonging within the calendar for the target period is extracted; and in the displaying step, based on the display date information about each of the contents extracted in the extracting step, indication information of each of the contents is arranged in the calendar for the target period.

In accordance with the content display method according to an embodiment of the invention described above, based on information to specify the period accepted in the accepting step, display date information about each of the contents stored and held is identified in the extracting step. More specifically, when a predetermined item of date information owned by a content belongs within the calendar for the target period, the date information is the display date information, whereas when a predetermined item of date information owned by a content does not belong within the calendar for the target period, for example, the date information is converted into the content having future date information in such a way that a period in the unit of a single year is added to the date information, or that a period in the unit of a single month is added thereto.

Then, in the extracting step, the content having display date information belonging within the calendar for the target period is extracted. Based on display date information about the contents, indication information of the contents extracted in the extracting step is arranged in the calendar for the target period, and the calendar in which the indication information is arranged is displayed on the display device in the displaying step.

Accordingly, in the display of the calendar, the indication information of the content having display date information on the same month and day in the previous year or on the same month and day in the second previous year can be displayed in the display section of the future date as well, and alternatively, the indication information of the content having display date information on the same day in the previous month or on the same day in the second previous month can be displayed in the display section of the future date as well. In other words, the area of the future dates in a calendar can be effectively utilized as well, and the contents acquired in the past can be effectively used.

In addition, a content display method according to an embodiment of the invention is the content display method described above, wherein in the accepting step, an input of identification information to identify a content that indication information has to be displayed in a calendar is accepted as the instruction input; in the extracting step, a content having the identification information accepted in the accepting step is extracted from contents stored and held; and in the displaying step, based on a predetermined item of date information about each of the contents extracted in the extracting step, a calendar for a target period is identified, for each of the contents extracted in the extracting step, when a predetermined item of date information owned by a content belongs within the calendar for the target period, the date information is identified as display date information, whereas when a predetermined item of date information owned by a content does not belong within the calendar for the target period, date information generated by a predetermined computation using the date information is identified as the display date information, and based on the identified display date information about each of the extracted contents, indication information of each of contents is arranged in the calendar for the target period.

According to the content display method according to an embodiment of the invention, the content having identification information accepted in the accepted step is extracted in the extracting step. Then, in the displaying step, based on the predetermined item of date information about each of the contents extracted in the extracting step, the calendar for the target period is identified, and in accordance with the identified calendar for the target period and the predetermined item of date information about each of the extracted contents, display date information about each of the contents is identified.

After the display date information about each of the contents is identified, in the displaying step, the extracting step, based on the display date information about the contents, the indication information of the extracted contents is arranged in the calendar for the target period, and the calendar in which the indication information is arranged is displayed on the display device.

Accordingly, for example, information indicating an event such as "field day" and "fireworks" can be used as identification information to extract the content added with the identification information, and then indication information of the extracted contents can be arranged and displayed on the calendar. In this case, in the display of the calendar, indication information of the content having display date information on the same month and day in the previous year or on the same month and day in the second previous year can be displayed also in the display section of the future date, and alternatively, indication information of the content having display date information on the same day in the previous month or on the same day in the second previous month can be displayed also in the display section of the future date. In other words, the area of the future dates in a calendar can be effectively utilized as well, and the contents acquired in the past can be effectively used.

According to the embodiments of the invention, an unprecedented experience can be readily offered for a user to "contemplate the future and think the past", or to "predict the future from information in the past" through the display of the calendar. In other words, the area of the future dates in a calendar can be effectively utilized as well, and the contents acquired in the past can be effectively used.

BRIEF DESCRIPTION OF THE DRAWINGS

FIG. 8 shows a diagram illustrative of an exemplary display of a calendar in the case in which a plurality of thumbnail images is arranged on one day;

FIGS. 10A and 10B show a diagram illustrative of a calendar created based on still image data of a target event;

FIGS. 11A and 11B show a diagram illustrative of a calendar created based on still image data of a target event;

FIG. 12 shows a flow chart illustrative of a process in the case in which a calendar (an event calendar) for a target event is displayed.

DESCRIPTION OF THE PREFERRED EMBODIMENTS

Hereinafter, an embodiment of a method, an apparatus, and a program according to an embodiment of the invention will be described with reference to the drawings.

1. The Configuration of a Content Display Apparatus

Figure 1:
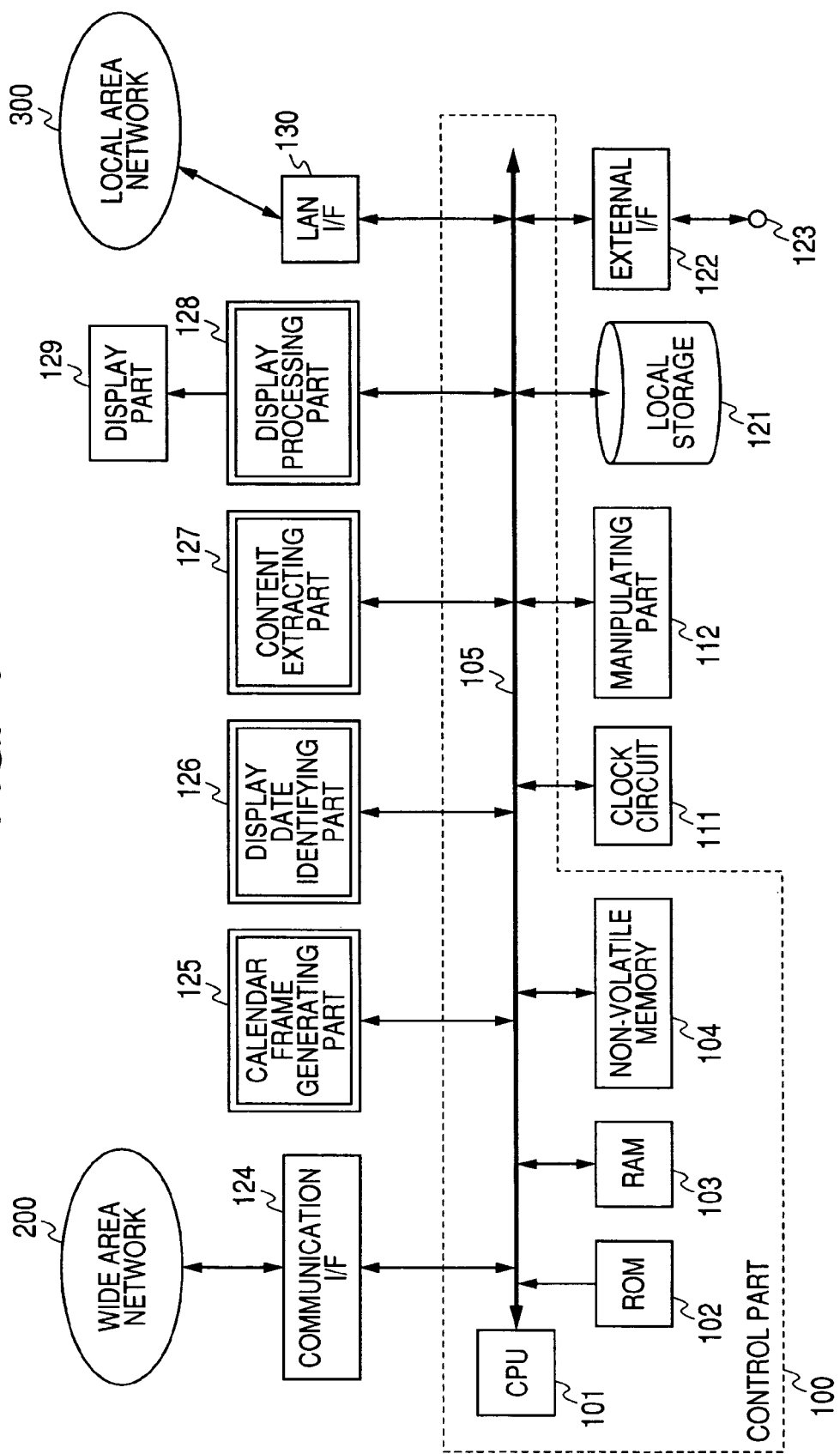
FIG. 1 shows a block diagram illustrative of a content display apparatus to which an embodiment of the invention is adapted.

First, a content display apparatus to which a method, an apparatus, and a program according to an embodiment of the invention are adapted will be described. FIG. 1 shows a block diagram illustrative of a content display apparatus according to this embodiment. The content display apparatus according to the embodiment will be described as it is supposed that the apparatus is implemented by a personal computer, for example, and disposed at home.

As shown in FIG. 1, the content display apparatus according to the embodiment has a control part 100, a clock circuit 111, a manipulating part 112, a local storage 121, an external interface (hereinafter, abbreviated for an external I/F) 122, an external input/output end 123, a communication interface (hereinafter, abbreviated for a communication I/F) 124, a calendar frame generating part 125, a display date identifying part 126, a content extracting part 127, a display processing part 128, a display part 129, and a LAN (Local Area Network) interface (hereinafter, abbreviated for a LAN I/F) 130.

The control part 100 controls the individual parts of the content display apparatus according to the embodiment. As shown in FIG. 1, the apparatus is configured in which a CPU (Central Processing Unit) 101, a ROM (Read Only Memory) 102, a RAM (Random Access Memory) 103, and a non-volatile memory 104 such as a flash memory or EEPROM (Electrically Erasable and Programmable ROM) are connected through a CPU bus 105 to form a microcomputer.

Here, the CPU 101 is the core of control; it executes programs stored and held in the ROM 102 to generate and supply control signals fed to the individual parts, and it receives signals from the individual parts and processes the signals. The ROM 102 stores and holds various programs to be executed by the CPU 101 as described above, and various items of data necessary for processing.

The RAM 103 is mainly used as a work area for temporarily storing the processed results in midstream. In addition, the non-volatile memory 104 stores and holds data that has to be stored and held even though the power source of the content display apparatus according to the embodiment is shut down, for example, various setting parameters, a newly provided program for an expanded function, various items of other data, and processed results.

The clock circuit 111 provides a present date, a present day of the week, and present time, the circuit 111 has a counter function that measures a specified period and the circuit 111 has a function that stores, holds and manages various items of information necessary to create past and future calendars and provides the information as requested from the control part 100.

The manipulating part 112 has a so-called keyboard with alphabet keys, numeral keys, and various function keys, and has a so-called pointing device such as a mouse and a trackball, which accepts various instruction inputs from a user, converts the inputs into electric signals, and notifies the control part 100. Thus, the control part 100 controls the individual parts in response to an instruction input from a user to allow the content display apparatus to perform a process intended by the user.

Then, the content display apparatus according to the embodiment is configured to acquire and display various contents such as Web pages published on a wide area network 200, contents published on a local network 300, contents stored in the local storage 121 of the apparatus, and contents stored and held in external devices connected through the external I/F 122 and the external input/output end 123.

The content display apparatus according to the embodiment is connected to the wide area network 200 such as the Internet through the communication I/F 124 controlled by the control part 100, and acquires various contents from various sites on the wide area network 200 to store and hold the contents in the local storage 121. In this case, contents at a so-called external site on the wide area network can be acquired trough an API (Application Program Interface) opened on each site.

In the content display apparatus according to the embodiment, the communication I/F 124 functions in accordance with control done by the control part 100 in response to an instruction input from a user accepted through the manipulating part 112, and as shown in FIG. 1, the apparatus can acquire blog information formed of contents such as photos and text information at blog sites on the wide area network 200, and contents such as still image data and moving image data from image sharing sites.

Of course, various contents such as still image data, moving image data, text data, and music data can be acquired from other various sites. Then, as described above, various contents acquired through the communication I/F 124 can be stored in a predetermined folder in the local storage 121 through the control part 100, and the contents can be read and used.

In addition, the content display apparatus according to the embodiment is connected to a predetermined local network 300 through the LAN I/F 130 controlled by the control part 100, acquires various contents such as still image data, moving image data, text data, and music data from various information devices connected to the local network 300, and stores and holds the contents in the local storage 121.

In other words, in the content display apparatus according to the embodiment, the LAN I/F 130 functions in accordance with control done by the control part 100 in response to an instruction input from a user accepted through the manipulating part 112, and as shown in FIG. 1, the apparatus can acquire various contents such as still image data, moving image data, text data, and music data from folders stored and held on recording media of various information devices on the local network 300. Then, as described above, various contents acquired through the LAN I/F 130 can be stored in a predetermined folder in the local storage 121 through the control part 100, and the contents can be read for use.

Moreover, the content display apparatus according to the embodiment can read and use various contents such as still image data, moving image data, text data, and music data stored and held in external devices connected through the external I/F 122 and the external input/output end 123. For example, the apparatus receives still image data supplied from a digital still camera connected to the external input/output end 123, and stores the data in a local folder formed on the local storage 121 to use the data.

Moreover, in the content display apparatus according to the embodiment, the external I/F 122 and the external input/output end 123 are a so-called digital interface such as a digital bus compliant to the USB (Universal Serial Bus) and IEEE (Institute of Electrical and Electronics Engineers)1394 standards, for example.

As described above, the content display apparatus according to the embodiment can acquire various contents such as still image data, moving image data, text data, music data, graphics data, game programs, and application programs through the communication I/F 124, the LAN I/F 130, the external I/F 122 and the input/output end 123, store the contents in the local storage 121, and read and use them as necessary.

Moreover, the local storage 121 can be configured with the use of various storages including a magnetic disk such as a hard disk, an optical disk such as a DVD (Digital Versatile Disc), a magneto-optical disk such as a MO (Magneto-optical Disk), and semiconductor memory. However, in the embodiment, the local storage 121 will be described as it is considered that a hard disk is supposed to be used that can implement a large capacity storage relatively at low costs with a fast access speed.

Then, the content display apparatus according to the embodiment has a calendar function in which a calendar for a specified period is created and displayed in accordance with a user instruction accepted through the manipulating part 112. For example, the content display apparatus according to the embodiment can create a calendar in the past, a calendar including the present day and a calendar in the future based on information provided from the clock circuit 111.

In addition, other than year calendars, monthly calendars, and weekly calendars, for creatable calendars, the apparatus can create a calendar for a given period specified by a user as well such as a six week calendar from a specified date and a calendar for a plurality of months specified.

Then, in the content display apparatus according to the embodiment, for indication information of a content, a thumbnail and an icon of the content are displayed on a calendar formed in the content display apparatus in accordance with display date information determined based on date information owned by each of the contents.

Generally, various contents are added with various items of date information. For example, still image data taken and acquired by a digital still camera is usually added with a taken date as date information. In addition, in the case in which some changes are added to a content such as still image data, information about an update date is sometimes added. In addition, in the case of a content opened on the wide area network, information about an open date (upload date) may be added, and in the case of a content such as music data, information of a sales date may be added.

Then, in the content display apparatus according to the embodiment, in the case in which a predetermined item of date information added to a content is a date included in a calendar created in accordance with a user instruction, the predetermined item of date information is identified as display date information. In addition, in the case in which a predetermined item of date information among items of information added to contents is not a date included in a calendar created in accordance with a user instruction, date information that is computed (generated) by a predetermined computation is identified as display date information.

Then, a content having the same items of display date information as a date belonging to a calendar to be created is extracted, indication information such as a thumbnail and an icon about the extracted content is arranged on the corresponding date in the created calendar, and the calendar is displayed on the display screen of the display part 129, the calendar on which the indication information of the contents is arranged.

Therefore, the indication information of the contents displayed on the past dates before the present day indicates that there are contents acquired on the past dates. In addition, on future dates after the present day, indication information of the contents acquired on the same month and day in the previous year and before is displayed, which allows a user to "contemplate the future and think the past" or to "predict the future from past information" based on the indications on the calendar.

More specifically, in FIG. 1, the calendar frame generating part 125 implements a function that generates a calendar frame for a specified period in response to an instruction input from a user accepted through the manipulating part 112. In addition, the display date identifying part 126 implements a function that identifies display date information about each of the contents based on a period belonging to the calendar frame (a period specified by a user) to be generated by the calendar frame generating part 125 and predetermined items of date information about the contents stored and held in the local storage 121 in accordance with control done by the control part 100.

In addition, the content extracting part 127 implements a function that extracts the contents whose indication information has to be displayed in the calendar frame generated by the calendar frame generating part 125 based on the period (the period specified by the user) belonging to the calendar frame generated by the calendar frame generating part 125 and the display date identified for each of the contents by the display date identifying part 126. In addition, the display processing part 128 implements a function that allocates indication information of the contents extracted by the content extracting part 127 to the calendar frame generated by the calendar frame generating part 125 to display it on the display screen of the display part 120.

Moreover, for example, the display part 129 has a display device such as an LCD (Liquid Crystal Display), an organic electroluminescent panel, a PDP (Plasma Display Panel), and a CRT (Cathode Ray Tube) and its control circuit, as described above, which receives video signals supplied from the display processing part 128 to display an image on the display screen of the display device.

In addition, in FIG. 1, the functions of the individual parts, the calendar frame generating part 125, the display date identifying part 126, the content extracting part 127, and the display processing part 128 surrounded by a double line, may be implemented by software executed by the control part 100. In other words, the functions of the individual parts, the calendar frame generating part 125, the display date identifying part 126, the content extracting part 127, and the display processing part 128, may be provided in the control part 100.

Moreover, for indication information of contents, for example, in the case in which a content is still image data or moving image data, the indication information may be a scale-down image such as a so-called thumbnail image that shows the descriptions and allows the selection of the content, and in the case in which a content is music data or audio data, the indication information may be a pictogram such as a so-called icon that shows that the content is at least music data or audio data and allows the selection of the content.

In addition, for indication information used to brows contents owned by the contents, in the case in which a content is music data, the indication information may be a thumbnail image such as the jacket of an album containing the music, and in the case in which a content is text data such as book review, the indication information may be a thumbnail image of a book cover or a thumbnail image showing the book review. In addition, in the case in which a content is a program, the indication information may be an icon to select the program.

In other words, indication information of contents is information that is a target to be shown such as a thumbnail image or an icon formed derived from the contents. In addition to these, in the case in which a content is text information, the indication information may be a predetermined title displayed in a predetermined size, and in the case in which a content is moving image data, the indication information may be an indication that reproduces moving images in the size of a thumbnail image for a predetermined time period.

Moreover, in the case in which a content does not have its indication information such as a thumbnail or an icon, indication information may be generated in the control part 100 or in the content extracting part 127 based on the content, or generated based on information such as a pictogram prepared in advance.

In addition, in the case in which a content does not have a predetermined item of date information, other items of date information may be used, or date information may be generated in the control part 100 or the display date identifying part 126 of the content display apparatus according to the embodiment. In this case, for date information to be generated, a system date may be used that is offered by the clock circuit 111 provided in the content display apparatus according to the embodiment, or date information may be used that is owned by the contents on the dates prior to and subsequent to the date.

In addition, in the case in which a content is image data, when there is similar image data, a predetermined item of date information about the similar image data may be used. In other words, for date information about the contents with no date information, date information may be generated by a predetermined method.

2. A Process of Identifying Display Date Information

As described above, in the content display apparatus according to the embodiment, a calendar frame for a period specified by a user is generated, and indication information of a content is displayed in a display section on the corresponding date in the frame. However, for example, such a scheme is performed in which information such as a taken date added to still image data is used as it is to display indication information of a content in the display section on past dates, as well as a predetermined item of date information owned by a content, such as date information generated by computation from a taken date, for example, is used as display date information to display indication information of the content on the display section on future dates.

Here, display date information identified for each of the contents will be described in detail. Moreover, for simplifying the discussion here, an example is taken and described that a content is still image data taken by a digital still camera, and a taken date (taken month, day and year) added to the individual items of still image data is used for a predetermined item of date information.

Figure 2:
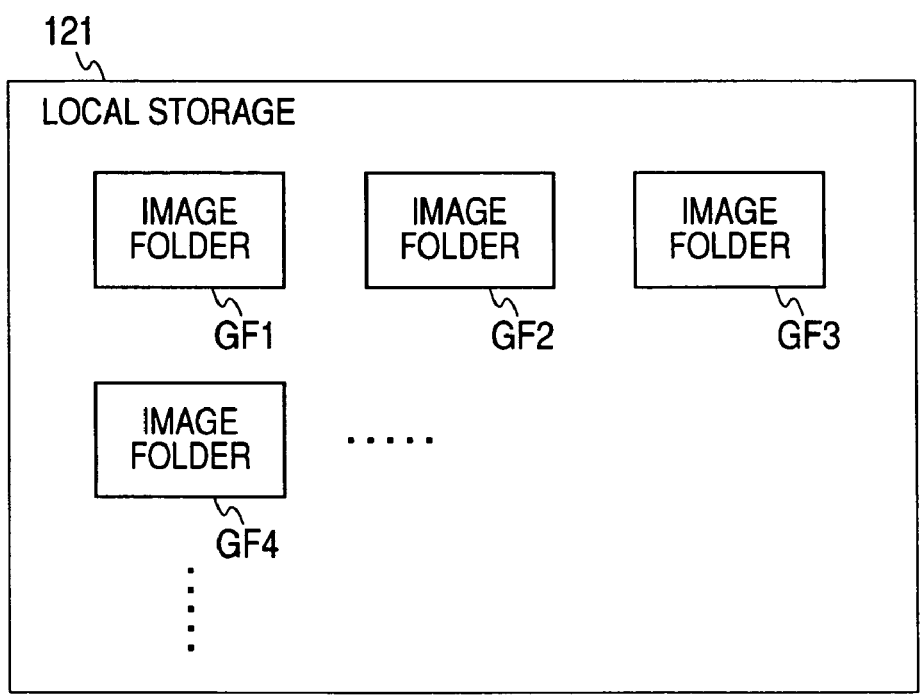
FIG. 2 shows a diagram illustrative of still image data that is contents stored and managed in a local storage.
Figure 3:
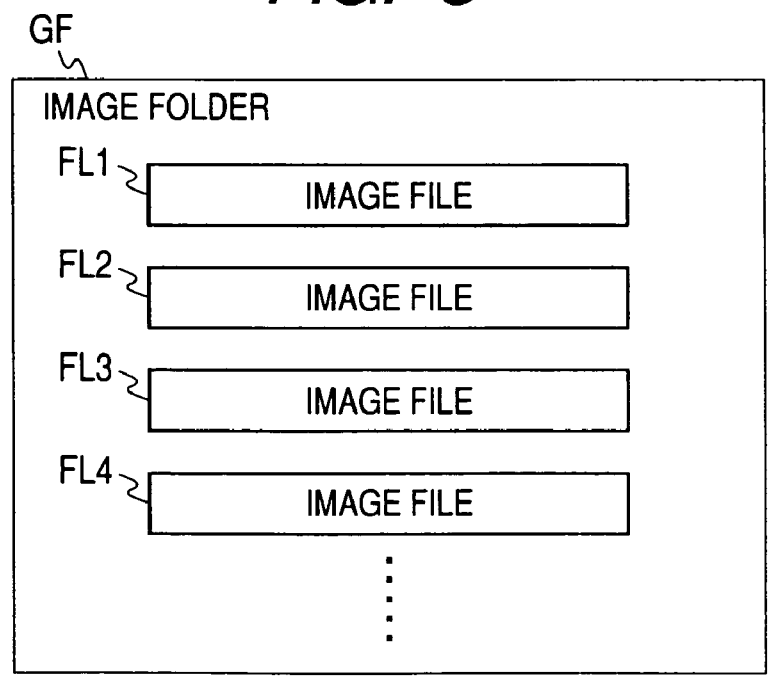
FIG. 3 shows a diagram illustrative of still image data that is contents stored and managed in a local storage.
Figure 4:
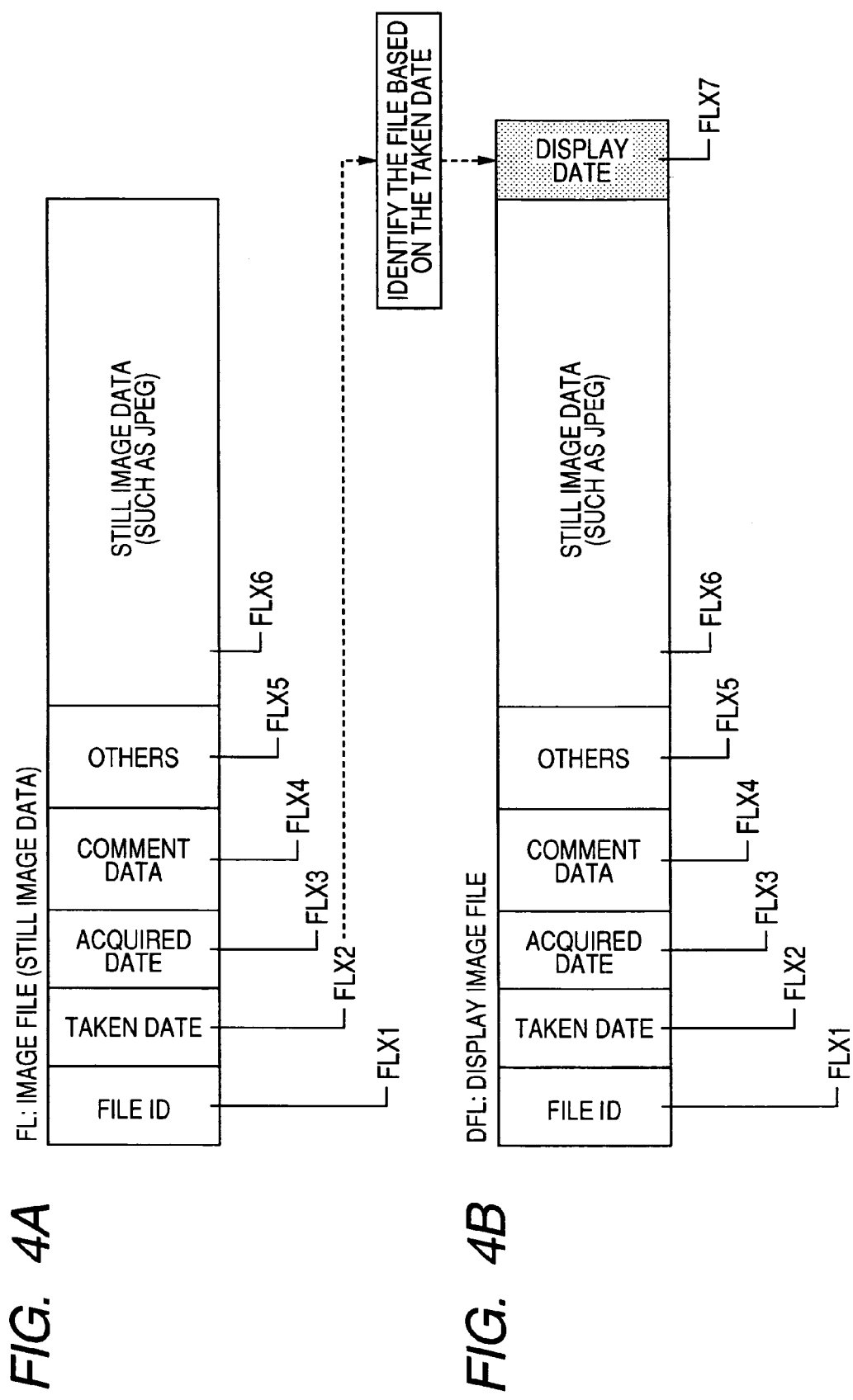
FIG. 4 shows a diagram illustrative of still image data that is contents stored and managed in a local storage.

FIGS. 2, 3, and 4A and 4B show a diagram illustrative of still image data that is contents stored and managed in the local storage 121 of the content display apparatus according to the embodiment. FIG. 2 shows a diagram illustrative of image folders formed in the local storage 121, FIG. 3 shows a diagram illustrative of the state of image files managed in an image folder GF, and FIGS. 4A and 4B show a diagram illustrative of an exemplary image file format and display date information.

Although still image data of a subject taken and obtained by a digital still camera can be managed in units of files of a single photo, a plurality of items of still image data is generally collectively managed in folders. For example, in FIG. 2, as depicted by image folders GF1, GF2, and so on, the local storage 121 is configured to have a plurality of image folders.

As shown in FIG. 3, in each of the image folders GF, a plurality of items of still image data is stored as image files (image data file) FL1, FL2, and so on, and can be managed collectively. In other words, a plurality of related items of still image data can be managed collectively in a single folder. For example, a plurality of items of still image data of travel photos is managed collectively in a single image folder GF1, and a plurality of items of still image data taken on a child's filed day is managed collectively in another single image folder GF2.

Then, as shown in FIG. 4A, each of the image files FL managed in the image folder GF is configured in which associated data, such as a file ID (FLX1), a taken date (FLX2), an acquired date (FLX3), comment data (FLX4), and others (FLX5), is added to main still image data (FLX6).

Here, the file ID (FLX1) is identification information for uniquely identifying the relevant file. The taken date (FLX2) is information indicating the taken date of the still image data, formed of a taken month, day and year. Of course, a taken point in time may be included. The acquired date (FLX3) is information indicating a date (acquired date) that is added to still image data offered from another device and added in the offered device, and the acquired date is formed of an acquired month, day and year. Also for the acquired date, a taken point in time may be included.

In addition, the comment data (FLX4) is text information about the still image data, which is text data including comments, details and memos for the still image data such as "in Kyoto on an autumn trip", "fireworks on Sumida river", and "Takashi's field day in the fifth grade". The others (FLX5) is various items of information about the still image data including shooting conditions such as a focal length and a shutter speed, identification information of a photographer, and shooting position information provided from a GPS (Global Positioning System).

Then, in the content display apparatus according to the embodiment, in date information associated with still image data, a taken date is used as a predetermined item of date information to identify display date information. In other words, as discussed above, in the content display apparatus according to the embodiment, in order to create a calendar for a target period by a user, the user enters information to instruct the target period through the manipulating part 112. As described above, in accordance with the information to instruct the period from the user, a calendar frame to create a target calendar by the user is generated by the function of the calendar frame generating part 125.

Then, the display date identifying part 126 processes all the items of still image data stored and held in the local storage 121, and identifies a taken date as display date information as it is when the taken date is within the period specified by the user (a period of the calendar to be created). In addition, the display date identifying part 126 identifies a date determined from a predetermined computation as display date information when there is no taken date within the period specified by the user (a period of the calendar to be created).

Here, in the case in which display date information is determined by computation will be described specifically. In the embodiment, it is supposed that a monthly calendar including a present day is created. Then, indication information of a content having a taken date on the same month in the past is included in a monthly calendar including a present day.

To this end, in the display date identifying part 126, based on a present day (present date) offered from the clock circuit 111, in the case in which a taken date is in the previous year and before, a value obtained by subtracting a taken year (year information about the taken date) from a present year (year information about the present day) is added to the taken date to obtain date information, and the date information is identified as display date information. When this is written in an equation, it can be expressed in Equation (1) below.

In other words, in the case in which the taken date is in the previous year and before, the following computation can be expressed:

$$\text{display date information} = \text{taken date} + (\text{present year} - \text{taken year}) \quad (1),$$

whereby display date information can be determined. In other words, in the case in which an image file has a taken date in the previous year and before, date information that the date is converted into a date in the present year and after (future date) based on the taken date is used as display date information.

Therefore, in the case in which a taken date is in the previous year, one year is added to the taken date to generate display date information, and in the case in which a taken date is in the second previous year, two years are added to the taken date to generate display date information, whereby display date information about still image data having a taken date in the previous year and before can be converted into a date in the present year including the present day.

Moreover, in the case in which the taken date is in the present year, Equation (1) is also effective. In other words, in the case in which the taken date is in the present year, the present year and the taken year are the same, and the equation (present year−taken year) is zero. Consequently, the taken date is used for display date information as it is.

As described above, when a taken date is within the period specified by the user, the taken date is identified as display date information as it is, whereas when a taken date is not within the period specified by the user, a date determined by a predetermined computation is identified as display date information, and then it is added to still image data as shown by display date information (FLX7) in FIG. 4B.

In this manner, all the items of still image data stored and held in the local storage 121 are processed to add display date information (FLX7). Then, an image file added with display date information (FLX7) is a display image file to display indication information of the content on the calendar.

Moreover, the display date information (FLX7) may be directly added to the original image file FL stored and held in the image folder GF, or this scheme may be performed in which as shown in FIG. 4B, the original image file FL stored and held in the image folder GF is read to generate another display image file DFL different from the image file FL formed by adding the display date information (FLX7) thereto, and the display image file DFL is temporarily stored in a temporal storage area (work area) on the local storage 121 for use.

As discussed above, since display date information is changed depending on a calendar to create, in the content display apparatus according to the embodiment, a display image file DFL added with display date information (FLX7) is generated as the original image file FL is unchanged, the display image file DFL is temporarily stored in the work area, and display date information is used for indication information of a content to display the content on the calendar.

Then, in the content display apparatus according to the embodiment, the function of the content extracting part 127 shown in FIG. 1 extracts a display image file having display date information belonging to the calendar for the period specified by the user from the display image files DFL added with display date information (FLX7), and a thumbnail image of still image data contained in the extracted display image file is formed.

After that, the display processing part 128 of the content display apparatus according to the embodiment functions to arrange the thumbnail image (the display image of the content) of still image data extracted and formed by the content extracting part 127 in the calendar frame generated by the calendar frame generating part 125, and the thumbnail image is displayed on the display screen of the display part 129.

3. A Specific Example of Display of a Calendar

Figure 5:
FIG. 5 shows a diagram illustrative of an exemplary display of a calendar displayed on a display screen.

FIG. 5 shows a diagram illustrative of an exemplary display of the calendar displayed on the display screen of the display part 129 in the content display apparatus according to the embodiment. In the embodiment, as discussed above, a monthly calendar including a present day is displayed, and FIG. 5 shows a diagram depicting a calendar in October 2006 which is formed when the present day is on Oct. 10, 2006.

In the calendar in October 2006 shown in FIG. 5, a period from October 1 to October 10 is a past period having already elapsed (hereinafter, referred to as an elapsed period) PA. Strictly speaking, the present day Oct. 10, 2006 includes a period (time) that has not elapsed, but the day is treated as included in an elapsed period. In addition, in FIG. 5, the period surrounded by a dotted line, that is, a period from October 11 to October 31 is a future period that has not elapsed (hereinafter, referred to as a non-elapsed period) NP.

Then, in the display of a calendar shown in FIG. 5, in the case in which there is a display image file DFL having display date information (FLX7) matched with a date included in the calendar, a thumbnail image of still image data of the display image file is displayed. However, the display image file to be a display target is different between the elapsed period PA and the non-elapsed period NP.

In other words, in FIG. 5, in the display area of each date in the elapsed period PA from October 1 to October 10, two types of thumbnail images are displayed: a thumbnail image of still image data of a display image file in which the taken date is used as display date information as unchanged in accordance with the process of identifying display date information described above, and a thumbnail image of still image data of a display image file in which the taken date is formed from an image file in the previous year and before, the date is converted into a date in the present year (the future date) based on the taken date to form date information with a date of the present month, and the date information is used as display date information.

In addition, in FIG. 5, in the display area of each day in the non-elapsed period NP from October 11 to October 31, a thumbnail image in accordance with still image data of a display image file is displayed in which the taken date is formed from an image file in the previous year and before in accordance with the process of identifying display date information, the date is converted into a date in the present year (the future date) based on the taken date to form date information with a date in the present month, and the date information is used as display date information.

Therefore, in the elapsed period PA, the thumbnail image of still image data taken in the present month and the thumbnail image of still image data taken on the same month and day in the previous year and before are display targets, whereas in the non-elapsed period NP, only the thumbnail image of still image data taken on the same month and day in the previous year and before is a display target.

Moreover, in the case in which there is a plurality of thumbnail images on the same day, since the display section of each date on the calendar is narrow and limited, for example, newer taken dates are displayed in priority. In addition, although the details will be described later, in the case in which a plurality of items of still image data exists on the same day, the thumbnail images are displayed in a list, or in turn displayed as a so-called slide show, and then all the thumbnail images are allowed to see.

Then, in the example shown in FIG. 5, still image data taken each day or still image data taken on the same month and day in the previous year and before exists in each of the display sections on October 1, 3, 6, 7, 8, and 10, and the thumbnail images are displayed.

In addition, the non-elapsed period NP from October 11 to October 31 is a future period as discussed above, and there is no still image data on each day in the present month and year in the non-elapsed period NP. Therefore, in the case in which the thumbnail image of still image data is simply displayed depending on the taken dates, nothing is displayed in the display areas of the individual days configuring the non-elapsed period NP.

However, in the case of the content display apparatus according to the embodiment, the thumbnail image of still image data taken on the same month and day in the previous year and before is displayed as described above. In the case of the calendar shown in FIG. 5, the thumbnail image of still image data taken on the same month and day in the previous year and before is displayed on each of October 13, 14, 15, 16, 18, 20, 24, 28, 29, and 31.

Then, in FIG. 5, in the display section on October 31, the thumbnail image of a photo of a Halloween party last year is displayed, which tells that the Halloween party was held on October 31 last year, and a user may contemplate the future and think the past, and might think "Halloween is coming soon. Halloween was carried out on a grand scale last year", or a user may predict the future from information in the past, and might think about "Halloween was held last year. It should be prepared for the party soon if held."

In addition, an old memory photo (thumbnail image) is displayed in the future portion, whereby the times are unified depending on the display of the calendar, and a user can see the photos in the past in the sense matched with human sensibilities, for example, the user might think "this was taken last year. Times are changed for one year." This is because a user sees a photo in the same season among photos in the past, whereby the user can look at a photo matched with people's lifestyle (for example, four seasons and annual events). For example, a user sees the calendar in October and thinks "a field day is coming soon", because the calendar has the photo of the field day last year, which may allow the user to contemplate the future and think the past.

This is important here in that a user can confirm how it goes on in the present month as well as can confirm the situations in the same month in the previous year and before, which allows the user to contemplate the future and think the past, or predict the future from information in the past. Like the calendar function before, a user does not see only information in the past, or contrary to this, a user does not see only the schedules in the future.

4. The Operation of the Content Display Apparatus

Next, a calendar display process performed in the content display apparatus according to the embodiment will be described. Moreover, as the embodiment described above, the calendar display process has two processes: a display process 1 in which display date information is added in advance to all the contents of the display target, the contents of the display target are extracted in accordance with the range of the calendar to create, and the indication information is displayed; and a display process 2 in which the contents to be a display target are extracted while display date information is in turn changed in accordance with the range of the calendar to create, and the indication information is displayed.

Hereinafter, the display process 1 and the display process 2 will be described separately, but the process for use may be set in fabricating the content display apparatus, or a user may set the process in advance.

Figure 6:
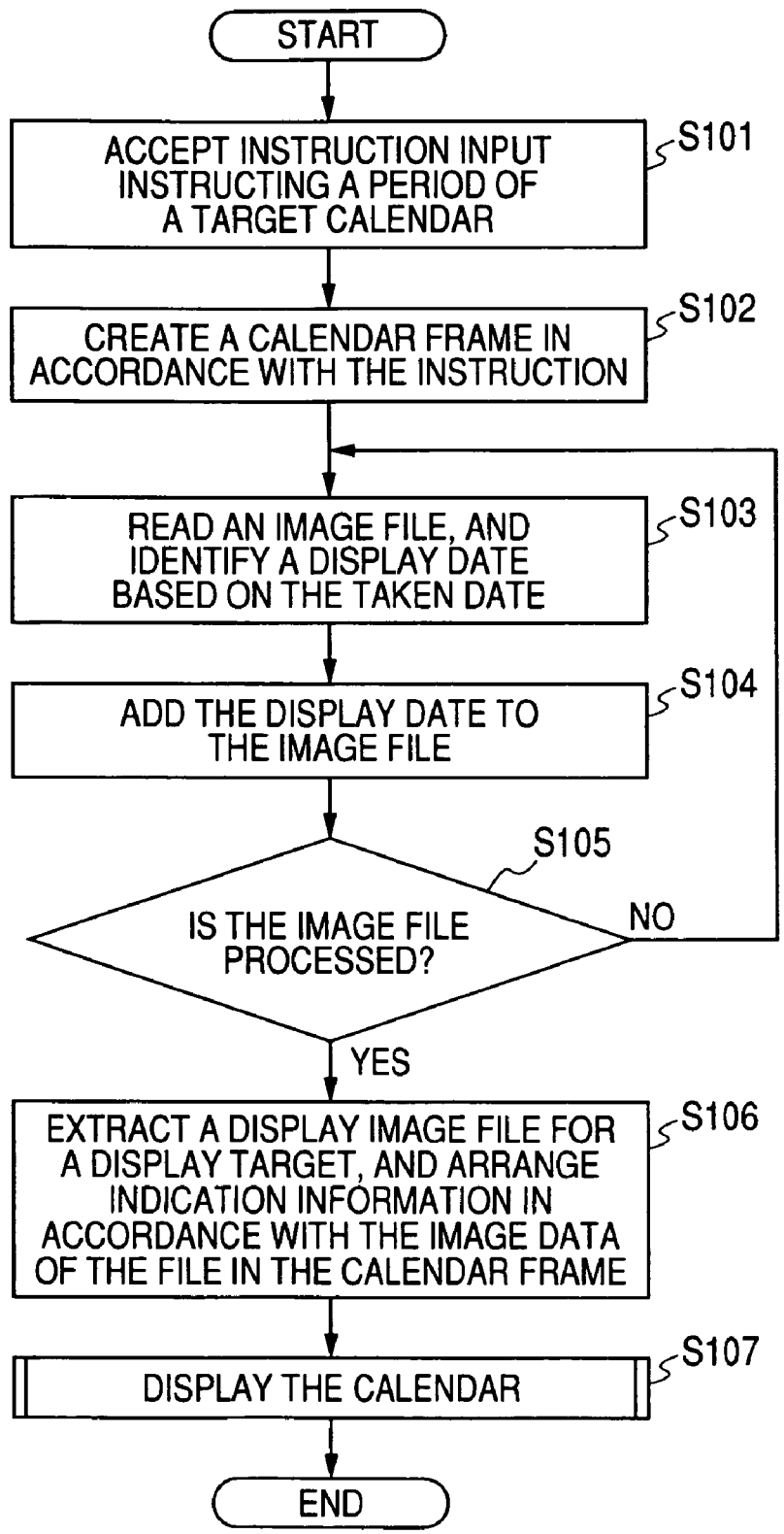
FIG. 6 shows a flow chart illustrative of a display process 1 for displaying a calendar.

4-1. Display Process 1 in which Display Date Information is added in advance FIG. 6 shows a flow chart illustrative of the display process 1 in which display date information is added in advance to all the contents of the display target, the contents of the display target are extracted in accordance with the range of the calendar to create, and the indication information is displayed. The process shown in FIG. 6 is a process executed in the control part 100.

A user enters an instruction input to display a calendar through the manipulating part 112, and then the control part 100 executes the process shown in FIG. 6. Then, the control part 100 first accepts an instruction input of a target period through the manipulating part 112 (Step S101). The control part 100 controls the calendar frame generating part 125 to create a calendar (calendar frame) for specified period in a predetermined area of the RAM 103, for example (Step S102).

Subsequently, the control part 100 controls the display date identifying part 126 to identify display date information for each of the image files (still image data) stored and held in the local storage 121 based on the taken date (taken month, day and year) of each image file (Step S103), and to add the identified display date information to the image file for the process target (Step S104). Moreover, for example, the process in Step S103 is a process for identifying display date information in accordance with the Equation (1) described above.

As discussed above, in the content display apparatus according to the embodiment, the control part 100 uses the function of the display date identifying part 126 to temporarily store and hold the display image file DFL added with the identified display date information as shown in FIG. 4B in a predetermined storage area of the local storage 121 to use the display image file DFL for display on the calendar.

Then, the control part 100 determines whether display date information is identified for all the image files to be a display target stored and held in the local storage 121 and it is finished to generate the display image files added with the information (Step S105). In the determination process in Step S105, if it is determined that the process has not been finished for all the image files, the process steps from Step S103 are repeated, the sub sequent image file is processed to identify display date information and to generate a display image file added with the information.

In the determination process in Step S105, if it is determined that the process has been finished for all the image files, the control part 100 controls the content extracting part 127 to extract the display image file having display date information matched with the date included in the calendar frame generated in Step S102 and to arrange the thumbnail image of still image data of the extracted display image files in the corresponding display areas in the calendar frame generated in the RAM 103 in Step S102, based on the display date information, and to organize the calendar of the display target (Step S106).

After that, the control part 100 controls the display processing part 128 to generate video signals to display the calendar on the display screen of the display part 129 based on the calendar organized by arranging the thumbnail images of still image data of the display target in Step S106 and to supply the signals to the display part 129, whereby for example, the calendar for the specified period is displayed in the form shown in FIG. 5 (the thumbnail images of still image data are displayed in the calendar frame) (Step S107), and the process shown in FIG. 6 is ended.

By the process shown in FIG. 6, the calendar can be created and displayed in which in still image data that is the contents stored in the local storage 121, the thumbnail image of still image data having corresponding display date information is displayed in the display area of the corresponding date in the calendar for the target period.

In the calendar in this case, the thumbnail image of still image data taken on the corresponding day is displayed in the display area of each of the dates configuring the elapsed period as well as the thumbnail image of still image data taken in the past and associated with the taken date can be displayed in the display area of each of the dates configuring the non-elapsed period. Thus, an unprecedented experience can be easily provided for a user through the display of the calendar such a way that the user might "contemplate the future and think the past", or "predict the future from information in the past".

Moreover, in this example, it is described that display date information is identified by adding the value (present year-taken year) based on the Equation (1) described above, but as described later, a unit period is not restricted to a "year". In the case in which it is desired to obtain an image one month before, it is sufficient that one month is added, and in the case in which an image on the same day of the week in the same month one year ago, it is sufficient that 364 is added to a desired day to display.

4-2. Display Process 2 in which Display Date Information is in Turn Changed

Figure 7:
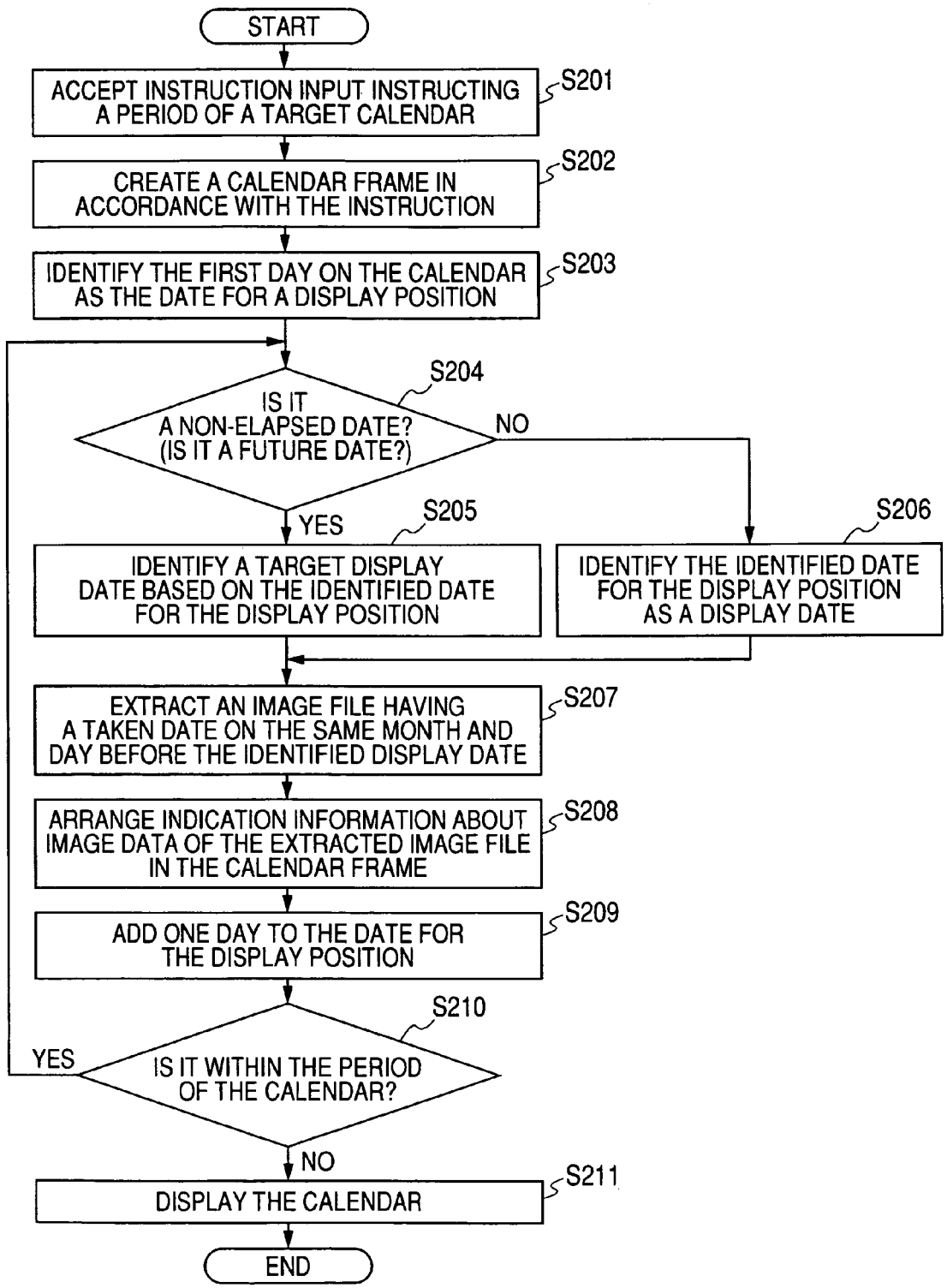
FIG. 7 shows a flow chart illustrative of a display process 2 for displaying a calendar.

FIG. 7 shows a flow chart illustrative of the display process 2 in which still image data (contents) to be a display target is extracted while display date information is in turn changed in accordance with the range of the calendar to create (period) and the indication information is displayed. The process shown in FIG. 7 is a process executed in the control part 100.

A user enters an instruction input to display a calendar through the manipulating part 112, and then the control part 100 executes the process shown in FIG. 7. The control part 100 first accepts an instruction input for a target period through the manipulating part 112 (Step S201). Then, the control part 100 controls the calendar frame generating part 125 to create a calendar for the specified period (calendar frame) in a predetermined area of the RAM 103, for example (Step S202).

Subsequently, the control part 100 identifies the first date on the calendar for the specified period as a date for a display position (Step S203). Then, first, the control part 100 controls the display date identifying part 126 to determine whether the identified date for a display position in Step S203 is a non-elapsed date based on the present date provided by the clock circuit 111 (Step S204).

In the determination process in Step S204, if it is determined that the identified date for a display position is a non-elapsed date, the display date identifying part 126 identifies target display date information based on the identified date for a display position (Step S205). Also in this example, since the indication information displayed on each day in the non-elapsed period NP is the thumbnail image of still image data taken on the same month and day in the previous year and before, the date that one year is subtracted from the identified date for a display position is identified as the target display date information.

In addition, in the determination process in Step S204, if it is determined that the identified date for a display position is not a non-elapsed date, the display date identifying part 126 identifies the identified date for a display position as the target display date information (Step S206).

Then, the control part 100 controls the content extracting part 127 to extract an image file having the same taken date as the display date information identified in Step S205 or Step S206 and an image file having a taken date in the same month and day in the previous year and before with reference to display date information from the image files stored and held in the local storage 121 (Step S207).

Subsequently, the control part 100 controls the content extracting part 127 to arrange the thumbnail image of still image data included in the image extracted file in Step S207 in the display area of the corresponding date in the calendar frame generated on the RAM 103 in Step S202 (Step S208).

Then, the control part 100 adds one day to the date for a display position (Step S209), and determines whether the date for a display position is within the period of the calendar specified by the user (Step S210). In the determination process in Step S210, if it is determined that the date for a display position is within the period of the calendar, the control part 100 determines that it is not finished to arrange the thumbnail image of still image data in the calendar for the period specified by the user, and repeats the process steps from Step S204.

In the determination process in Step S210, if it is determined that the date for a display position is not within the period of the calendar, the control part 100 determines that it is finished to arrange the thumbnail image of still image data in the calendar for the period specified by the user, and it controls the display processing part 128 to generate video signals to display the calendar on the display screen of the display part 129 based on the calendar in which the thumbnail images of still image data of a display target are arranged and organized on the calendar frame generated in the RAM 103, and supplies the signals to the display part 129, whereby the calendar for the specified period is displayed in the form shown in FIG. 5, for example, (the thumbnail images of still image data are displayed in the calendar frame) (Step S211), and the process shown in FIG. 7 is ended.

As described above, in the case of the display process 2 shown in FIG. 7, it is confirmed whether there is an image file to display a thumbnail image for each of the dates configuring the calendar to create, and in the case in which there is an image file to display the thumbnail image, the thumbnail image of still image data of the image file is arranged in the display area of the corresponding date in the generated calendar frame. Then, after the process is ended in which the thumbnail image is arranged for each of the dates configuring the calendar to create, the calendar is displayed.

In this case, since the image file is extracted for each of the dates configuring the calendar, the storage capacity of the work area in which the extracted image file is temporarily stored can be reduced. In the case of the display process 1 described with reference to FIG. 6, the work area having the capacity that can temporarily store at least all the image files stored and held in the local storage 121 is necessary, whereas in the case of the display process 2 described with reference to FIG. 7, it is sufficient that there is the work area having a very small storage capacity and it is unnecessary to rewrite the image file. Therefore, it is preferable to apply the display process 2 to the case in which there is no margin for the storage capacity of the local storage 121 and to a portable information processing terminal that is difficult to mount a storage with a large capacity (a recording medium).

Moreover, in this example, one year is subtracted, but as described later, a unit period is not restricted to one year, it is sufficient to subtract one month when it is desired to obtain an image one month before, and it is sufficient to subtract 364 from the day desired to display when it is desired to obtain an image on the same day of the week in the same month one year before.

5. A Display Process in the Case in which a Plurality of Thumbnail Images is Arranged on One Day Thumbnail images of a plurality of items of still image data are sometimes arranged on each of the dates configuring a calendar to display. In this case, since the display area of each date is very limited, as discussed above, the thumbnail image of still image data having the latest taken date is displayed in priority. However, of course, it is sometimes desired to see the other thumbnail images arranged on the same day.

Figure 8:
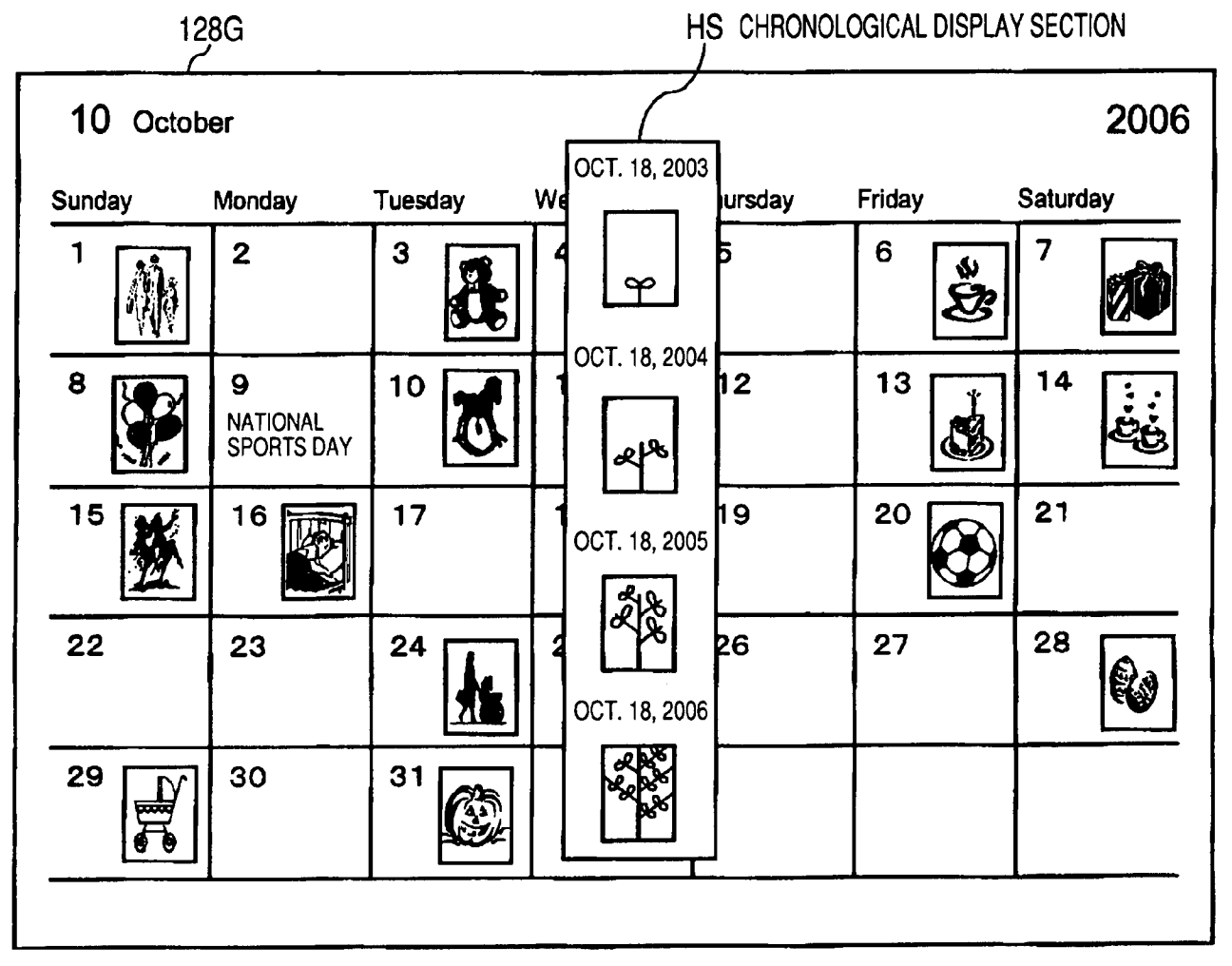

In this case, in the content display apparatus according to the embodiment, the thumbnail images arranged on the date specified by a user are displayed in a list. FIG. 8 shows a diagram illustrative of an exemplary display of a calendar in the case in which a plurality of thumbnail images is arranged on one day.

In this example, FIG. 8 shows a calendar in October 2006 created as Oct. 18, 2006 is the present day. Then, there are thumbnail images of still image data in last four years including the present year in the display section on October 18, and it is supposed that the thumbnail image of still image data having the latest taken date is displayed in priority because the display area is limited.

At this time, through the mouse of the manipulating part 112, for example, a predetermined manipulation is performed such a way that a cursor is positioned and double-clicked in the display section on October 18 on the display of the calendar, whereby in FIG. 8, the thumbnail images of still image data in last four years arranged on October 18 can be displayed in a list as shown in a chronological display section HS.

The example shown in FIG. 8 is an example in the case in which the state of the tree planted in a garden on Oct. 18, 2003 has been taken on the same day every year (the same month and day). In FIG. 8, as shown in the chronological display section HS, since the thumbnail images of still image data taken on the same month and day in last four years are displayed in a list, the process of growth of the tree planted in the garden can be confirmed.

Then, through the mouse of the manipulating part 112, for example, a predetermined manipulation is performed such a way that the cursor is positioned and double-clicked on any one of a plurality of the thumbnail images displayed in the chronological display section HS, whereby the still image corresponding to the thumbnail image pointed by the cursor can be displayed in normal size.

In addition, through the mouse of the manipulating part 112, for example, a predetermined manipulation is performed such a way that the cursor is positioned and clicked in the area in which the thumbnail image in the chronological display section HS is not displayed, whereby the chronological display section HS is deleted to return the display to the original display of the calendar.

Moreover, in the content display apparatus according to the embodiment, even though a predetermined manipulation is performed in the display section of the date on which only a single thumbnail image is arranged and a user tries to display the chronological display section, the chronological display section is not displayed. In addition, in the display section of the date on which only a single thumbnail image is arranged, through the mouse of the manipulating part 112, for example, a predetermined manipulation is performed such a way that the cursor is positioned and double-clicked on the thumbnail image displayed in the display section of the date on the calendar, whereby a still image corresponding to the thumbnail image can be displayed in normal size.

Figure 9:
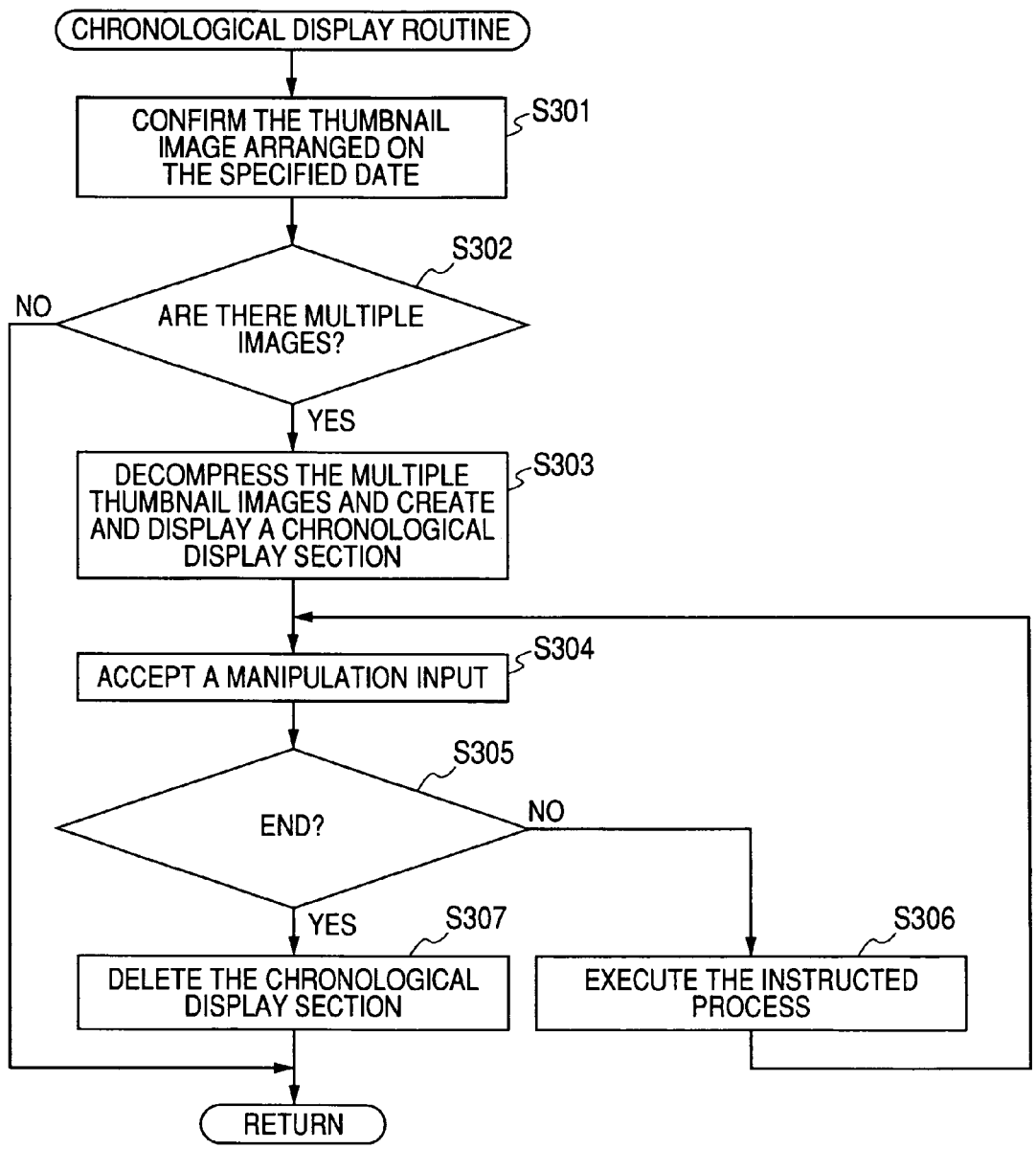
FIG. 9 shows a flow chart illustrative of a process in the case in which a plurality of thumbnail images to be arranged on the same day is displayed in chronological order.
Figure 13:
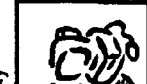
FIG. 13 shows a diagram illustrative of an embodiment of a content management scheme before that uses a calendar function to manage contents such as still image data obtained in the past.

FIG. 9 shows a flow chart illustrative of a process performed in the content display apparatus according to the embodiment in the case in which a plurality of thumbnail images arranged (allocated) on the same day is displayed in chronological order as shown in FIG. 8. As discussed above, FIG. 9 shows the process executed in the control part 100 when a predetermined manipulation is accepted such a way that through the mouse of the manipulating part 112, for example, a cursor is positioned and double-clicked in the display section of each of the dates on the calendar to display the chronological display section HS.

First, the control part 100 confirms a thumbnail image arranged on the date specified by a user pointing it with the cursor (Step S301). Then, the control part 100 determines whether a plurality of thumbnail images is arranged on the specified date based on the confirmed result in Step S301 (Step S302). In the determination process in Step S302, if the control part 100 determines that a plurality of thumbnail images is not arranged (one thumbnail image or none is arranged) the control part 100 does nothing and ends the process shown in FIG. 9.

In the determination process in Step S302, if the control part 100 determines that a plurality of thumbnail images is arranged on the specified date, the control part 100 decompresses a plurality of the thumbnail images in the work area of the RAM 103 to generate a chronological display section as well as controls the display processing part 128 to display the chronological display section generated as shown in FIG. 8 on the calendar being displayed (Step S303).

Then, the control part 100 accepts a manipulation input from the user through the manipulating part 112 (Step S304). The control part 100 determines whether the manipulation input accepted in Step S304 instructs finishing the display of the chronological display section HS (Step S305). In the determination process in Step S305, if the control part 100 determines that the input does not instruct finishing the display of the chronological display section HS, the control part 100 performs the instructed process, for example, the process of showing the still image corresponding to the thumbnail image in normal size, and the process of returning the still image in normal size to the display of the chronological display section (Step S306), and the process steps from Step S304 are repeated.

In the determination process in Step S305, if the control part 100 determines that the manipulation input accepted in Step S304 instructs finishing the display of the chronological display section HS, the control part 100 controls the display processing part 128 to delete the chronological display section HS displayed on the display screen of the display part 129 and return the display to the display of the original calendar (Step S307), and the process shown in FIG. 9 is ended.

As described above, in the content display apparatus according to the embodiment, the thumbnail images not displayed in the display section of each date on the calendar can be displayed in a list as shown in FIG. 8. Thus, the thumbnail images of still image data taken on the same month and day in the past can be confirmed at the same time, and the changes can be known.

Moreover, in FIGS. 8 and 9, in the case in which a plurality of thumbnail images is arranged in the display section of a single date, the thumbnail images can be displayed in a list in accordance with the user instruction, but it is not restricted thereto. For example, such a scheme may be performed in which the display of the thumbnail images displayed on the display section of the date is switched for predetermined time intervals as a slide show and different thumbnail images are in turn displayed on the same display section.

In addition, the example shown in FIG. 8 is an example of displaying the thumbnails of still image data taken on the same month and day in the previous year and before in a list, which is not restricted thereto. The thumbnail images of still image data taken on the same day in the month before the present month may be displayed in a list, or may be in turn displayed as a slide show.

Similarly, the thumbnail images of still image data taken on the same day in every few months before the present month may be displayed in a list, or may be in turn displayed as a slide show.

6. Other Examples of Display Date Information

In the embodiment discussed above, in the case in which of the example described with reference to FIG. 5, the elapsed period PA and the non-elapsed period NP are identified based on the present day in the monthly calendar to display, the thumbnail image of still image data having the taken date on the same month and day in the present year and before is displayed in the display section of each of the dates configuring the elapsed period PA, whereas the thumbnail image of still image data having the taken date on the same month and day in the previous year and before is displayed in the non-elapsed period NP, which is not restricted thereto.

For example, the thumbnail image of still image data having the taken date corresponding to the day in the present month in the present year is displayed in the display section of each of the dates configuring the elapsed period PA, whereas only the thumbnail image of still image data having the taken date on the same month and day in the previous year is displayed in the non-elapsed period NP. The range of the taken dates of the still images to be a display target may be a certain single year, not a plurality of years.

Moreover, in the case of the embodiment described above, in order to arrange the thumbnail images of still image data having the taken date on the same month and day in the different year in the monthly calendar in the present year, even though still image data has different taken years, the same items of display date information can be identified for still image data taken on the same month and day. This can be similarly processed in the case in which still image data having different taken years is treated as well as in the case in which still image data having the taken date in a single year.

In other words, although display date information is identified based on a predetermined item of date information owned by a content such as the taken date, only the contents in a single year having a predetermined item of date information being N (N is an integer equal to or greater than zero) years ago may be a display target, or the contents for a plurality of years in a predetermined item of date information being N (N is an integer equal to or greater than zero) year and before may be a display target. Such a scheme may be possible to create a calendar formed only of a past period in which the reference date is set to the date before the present day and only the contents in a single year having a predetermined item of date information being N (N is an integer equal to or greater than zero) years ago is a display target, or the contents for a plurality of years in a predetermined item of date information being N (N is an integer equal to or greater than zero) year and before is a display target.

In addition, conversely, such a scheme may be possible in which the reference date is set to a predetermined date in the past and only the contents in a single year after a predetermined item of date information being N (N is an integer equal to or greater than zero) year are a display target, or the contents for a plurality of years from a predetermined item of date information being N (N is an integer equal to or greater than zero) year and later are a display target. In addition, a calendar formed only of a future period may be possible in which the reference date is set to a date after the present day and only the contents in a single year after a predetermined item of date information being N (N is an integer equal to or greater than zero) years are a display target, or the contents for a plurality of years from a predetermined item of date information being N (N is an integer equal to or greater than zero) year and later are a display target.

In addition, a unit period is not restricted to a unit of a single year. Only the contents for a single week a predetermined item of date information being N (N is an integer equal to or greater than zero) weeks ago may be a display target, or the contents for a plurality of weeks a predetermined item of date information being N (N is an integer equal to or greater than zero) weeks ago may be a display target. In addition, such a scheme may be possible in which the reference date is set to a predetermined date in the past and only the contents for a single week a predetermined item of date information being N (N is an integer equal to or greater than zero) weeks later are a display target, or the contents for a plurality of years from a predetermined item of date information being N (N is an integer equal to or greater than zero) week and later are a display target.

In addition, even though a unit period is set to N weeks, a calendar formed only of a past period may be created, or a calendar formed only of a future period may be created depending on the reference date being a past date or a future date.

Similarly, only the contents for a single month a predetermined item of date information being N (N is an integer equal to or greater than zero) months ago may be a display target, or the contents for a plurality of months a predetermined item of date information being N (N is an integer equal to or greater than zero) months ago may be a display target. In addition, such a scheme may be possible in which the reference date is set to a predetermined date in the past and only the contents for a single month a predetermined item of date information being N (N is an integer equal to or greater than zero) months later are a display target, or the contents for a plurality of years from a predetermined item of date information being N (N is an integer equal to or greater than zero) month and later are a display target.

In addition, even though a unit period is set to N months, a calendar formed only of a past period may be created, or a calendar formed only of a future period may be created depending on the reference date being a past date or a future date.

In addition, only the contents on the same day of the week near the same date in a single year a predetermined item of date information being N (N is an integer equal to or greater than zero) years ago may be a display target, or only the contents on the same day of the week near the same date in each year in a predetermined item of date information being N (N is an integer equal to or greater than zero) year and before may be a display target. In addition, such a scheme may be possible in which the reference date is set to a predetermined date in the past and only the contents on the same day of the week near the same date in a single year a predetermined item of date information being N (N is an integer equal to or greater than zero) years later are a display target, or only the contents on the same day of the week near the same date in each year from a predetermined item of date information being N (N is an integer equal to or greater than zero) and later are a display target.

In addition, only the contents on the same day of the week near the same date in a single month a predetermined item of date information being N (N is an integer equal to or greater than zero) months ago may be a display target, or only the contents on the same day of the week near the same date in each month in a predetermined item of date information being N (N is an integer equal to or greater than zero) month and before may be a display target. In addition, such a scheme may be possible in which the reference date is set to a predetermined date in the past and only the contents on the same day of the week near the same date in a single year a predetermined item of date information being N (N is an integer equal to or greater than zero) months later are a display target, or only the contents on the same day of the week near the same date in each month from a predetermined item of date information being N (N is an integer equal to or greater than zero) month and later are a display target.

In addition, only the contents on the same anniversaries, holidays, and event days in a single year a predetermined item of date information being N (N is an integer equal to or greater than zero) years ago may be a display target, or only the contents on the same anniversaries, holidays, and event days in a predetermined item of date information being N (N is an integer equal to or greater than zero) year and before may be a display target. In addition, such a scheme may be possible in which the reference date is set to a predetermined date in the past and only the contents on the same anniversaries, holidays, and event days in a single year a predetermined item of date information being N (N is an integer equal to or greater than zero) years later are a display target, or only the contents on the same anniversaries, holidays, and event days in each year from a predetermined item of date information being N (N is an integer equal to or greater than zero) and later are a display target.

Here, whether to be the same holiday is found from information on the calendar. For example, Coming-of-Age Day, Health-Sports Day, and Autumnal Equinox Day fall on different dates in every year, but the information which holiday falls on what month and day is held as calendar information, whereby still image data taken on Health-Sports Day in each year can be extracted even though dates are different. In addition, for example, anniversaries and events carried every year are described in comment data of an image file, whereby only the still images of the same anniversary and event day taken every year can be a display target.

Therefore, for example, when a photo one year ago is displayed on the present calendar, the same anniversaries, holidays, and event days (birthday, field day, Vernal Equinox Day, and others) last year can be displayed on the same anniversaries, holidays, and event days this year at the highest priority.

In addition, holidays (Saturday and Sunday) near the same date last year can be displayed on the present holidays (Saturday and Sunday). In this case, the photos on events last year with holidays such as the events "I went to a restaurant on Sunday" and "I played soccer" can be displayed on the corresponding holidays on the present calendar. Moreover, the same dates other than holidays (weekdays) can be displayed on the same dates. In addition to this, based on matching of the days of the week, anniversaries (birthdays) may be matched with the date.

In addition, as described above, although the thumbnail images of still image data in the past in the present year and before can be displayed on the calendar, it is necessary to confirm when the thumbnail images were taken. To this end, for example, as shown in the chronological display section HS in FIG. 8, thumbnail images are again allocated in accordance with display date information and arranged on the same month and day, and it can be indicated when the data was taken for each of the thumbnail images, in such a form in which thumbnail images are indicated by the original taken month, day and year, such as "Oct. 18, 2003", "Oct. 18, 2004", "Oct. 18, 2005", and "Oct. 18, 2006", or in which thumbnail images are indicated how many years ago they were taken, such as "three years ago", "two years ago", "one year ago", and "this year" because months and days can be found from a calendar.

In addition, an icon, a mark or text may be used for indications. For example, for the thumbnail image of still image data taken in the present month, a "true mark (a mark indicating that the thumbnail image is displayed in the display section of a true date)" may be added, for the thumbnail image of still image data having the latest taken date, a "NEW mark" may be added, or for each of the thumbnail images of still image data that are again allocated in accordance with display date information and arranged on the same month and day, a "reallocated mark" may be added.

In addition, the thumbnail images may be distinguished from a color or a shape of indication information. For example, the color for the frame of the thumbnail image may be changed every week, month and year; the frame of the thumbnail image of still image data in the present year is white, the frame of the thumbnail image of still image data in the previous year is red, and the frame of the thumbnail image of still image data in the second previous year is blue. In addition, the display shape of the thumbnail image may be changed every week, month and year; the shape of the thumbnail image of still image data in the present year is a rectangle, the shape of the thumbnail image of still image data in the previous year is a circular shape, and the shape of the thumbnail image of still image data in the second previous year is a cloud shape.

In addition, the thumbnail image may be filtered. For example, the differences between the taken dates of the corresponding thumbnail images of still image data may be shown in such a way that the thumbnail image of still image data in the present year is clearly displayed with no filtering, the clearness of the color of the thumbnail images is gradually dropped so that the filter strength is more increased toward the past, and the color is made almost monotone or sepia tone, or time-worn, or more damaged.

For example, these processes for the thumbnail image can be implemented as the function of the display processing part 128 controlled by the control part 100.

7. Other Examples of Creating a Calendar

In the embodiment discussed above, a calendar for the specified period is created and displayed based on the instruction input for the period by a user accepted through the manipulating part 112, which is not restricted thereto. A calendar can be created based on the still image data of a target event. Also in this case, the calendar can be created by the content display apparatus in the configuration shown in FIG. 1. Therefore, the case will be described also with reference to FIG. 1 in which a calendar is created based on the still image data of a target event.

FIGS. 10A, 10B, 11A and 11B show a diagram illustrative of a calendar created based on still image data of a target event. FIGS. 10A and 10B show an example of a calendar created in which information about an event is a "field day", and FIGS. 11A and 11b show a calendar created in which information about an event is "fireworks".

First, the case will be described with reference to FIG. 1 and FIGS. 10A and 10B in which a calendar is created as information about an event is a "field day". First, a user instructs creating an event calendar through the manipulating part 112, and inputs text information "field day" as information about an event through the manipulating part 112. Then, the control part 100 controls the content extracting part 127 to extract image files including the text "field day" in comment data among the image files stored and held in the local storage 121.

Then, the control part 100 controls the calendar frame generating part 125 to generate a calendar frame in the present year matched with the month of the taken date of the extracted image file (a calendar frame in the present year having the same month as the taken date) in the work area of the RAM 103. In this example, a number of image files having comment data including the text "field day". Suppose the taken months of the image files are September and October, and then the calendar frame in September in the present year (September in the year including the creating date of the calendar) as shown in FIG. 10A is generated, and the calendar frame October in the present year (October in the year including the creating date of the calendar) as shown in FIG. 10B is generated.

Subsequently, the control part 100 controls the display date identifying part 126 to determine and identify display date information for each of the extracted image files by computation in accordance with the Equation (1) described above. Then, based on the display date information about each of the extracted image files, the control part 100 arranges thumbnail images in the generated calendar frame as indication information of still image data of each of the image files.

Moreover, the function of the content extracting part 127 may create a thumbnail image in extracting an image file and may store the thumbnail image as the thumbnail image is added to every image file, or associated with the image file, and alternatively, the control part 100 may create a thumbnail image in arranging the thumbnail image in a calendar frame.

Then, the control part 100 finishes arranging the thumbnail images of still image data of the extracted image files in the calendar frame, it controls the display processing part 128 to generate video signals to display the calendar in which the thumbnail images are arranged in the display sections of the corresponding dates and to supply them to the display part 129, and displays the calendars shown in FIGS. 10A and 10B on the display screen of the display part 129.

In this example, a number of items of image data including the text "field day" in comment data are extracted, and based on the display date information, for example, as shown in FIGS. 10A and 10B, thumbnail images are displayed in the display sections of the corresponding dates such as September 23, 24, October 1, 8, 9, 10, and 15.

Then, from the display of the calendars shown in FIGS. 10A and 10B, it is shown that the field day is held from late September to the middle ten days of October every year, as well as the situations of the field day in the past can be known from the displayed thumbnail image and the image in normal size of the corresponding still image data displayed by selecting the thumbnail image.

Moreover, in this example, since the image files having comment data including the text "field day" are spanned between September and October, calendars in September and October are created. In the content display apparatus according to the embodiment, the calendars in September and October can be in turn switched and displayed. In addition, in the case in which a plurality of thumbnail images is arranged on the same date, as discussed with reference to FIG. 8, thumbnail images arranged on the specified date may be displayed in a list, or the thumbnail images may be in turn switched and displayed as a slide show.

In addition, the field day is sometimes held in the season other than autumn such as May. For example, in the case in which there is an image file taken in May and including the text "field day" in comment data, a calendar in May in the present year is created as well.

Next, the case will be described with reference to FIGS. 1, 11A and 11B in which a calendar is created as information about an event is "fireworks". First, a user instructs creating an event calendar through the manipulating part 112, and inputs the text information "fireworks" as information about an event through the manipulating part 112. Then, the control part 100 controls the content extracting part 127 to extract image files including the text "fireworks" in comment data among the image files stored and held in the local storage 121.

Then, the control part 100 controls the calendar frame generating part 125 to generate a calendar frame in the present year matched with the month of the taken date of the extracted image files (the calendar frame in the present year in the same month as that of the taken date) in the work area of the RAM 103. In this example, a number of the image files having comment data including the text "fireworks" are extracted. Suppose the taken months are July and August, a calendar frame in July in the present year (July in the year including the date of creating the calendar) as shown FIG. 11A is generated, and a calendar frame in August in the present year (August in the year including the date of creating the calendar) as shown in FIG. 11B is generated.

Subsequently, the control part 100 controls the display date identifying part 126 to determine and identify display date information about each of the extracted image files by computation in accordance with the Equation (1) described above. Then, based on the display date information about each of the extracted image files, the control part 100 arranges thumbnail images in the generated calendar frame as indication information of still image data of each of the image files.

Then, the control part 100 finishes arranging the thumbnail images of still image data of the extracted image files in the calendar frame, it controls the display processing part 128 to generate video signals to display the calendar in which the thumbnail images are arranged in the display sections of the corresponding dates and to supply them to the display part 129, and it displays the calendars shown in FIGS. 11A and 11B on the display screen of the display part 129.

In this example, a number of items of image data including the text "fireworks" in comment data are extracted, and based on the display date information, for example, as shown in FIGS. 11A and 11B, the thumbnail images are displayed in the display sections of the corresponding dates such as July 21, 22, 29, August 1, 5, 6, 12, and 15.

Then, from the display of the calendars as shown in FIGS. 11A and 11B, it is shown that fireworks are held a lot from late July to the middle ten days of August every year, as well as the situations of the fireworks in the past can be known from the displayed thumbnail images and the image in normal size of the corresponding still image data displayed by selecting the thumbnail image.

Moreover, in this example, since the image files having comment data including the text "fireworks" are spanned between two months July and August, calendars in July and August are created. In the content display apparatus according to the embodiment, the calendar in July and the calendar in August can be in turn switched and displayed. In addition, in the case in which a plurality of thumbnail images is arranged on the same the date, as discussed with reference to FIG. 8, the thumbnail images arranged on the specified date may be displayed in a list, or the thumbnail images may be in turn switched and displayed as a slide show.

FIG. 12 shows a flow chart illustrative of a process in the case in which a calendar (event calendar) on a target event as shown in FIGS. 10A, 10B, 11A and 11B is displayed in the content display apparatus according to the embodiment. The process shown in FIG. 12 is a process mainly executed in the control part 100.

As discussed above, an instruction input from a user to create an event calendar is accepted through the manipulating part 112, and then the control part 100 executes the process shown in FIG. 12. First, the control part 100 accepts an input of event information through the manipulating part 112 (Step S401). In the embodiment, as discussed above, event information is information about an event held in the past such as a "field day" and "fireworks", and information about the event for which there may be still image data at that time.

Subsequently, the control part 100 controls the content extracting part 127 to extract image files (contents) having comment data including event information accepted in Step S401 (Step S402). Then, in the content display apparatus according to the embodiment, the control part 100 controls the calendar frame generating part 125 to generate a calendar frame in the present year in the same month as the taken month of all the image files extracted in Step S402 (Step S403).

Then, the control part 100 controls the display date identifying part 126 to identify and add display date information to all the extracted image files (Step S404), and arranges the thumbnail images corresponding to still image data of each of the image files in the display section of the corresponding dates in the calendar frame generated in Step S403 based on the display date information about each of the image files (Step S405).

Then, the control part 100 controls the display processing part 128 to generate video signals that display the event calendar and are supplied to the display part 129 based on information about the calendar frame in which the thumbnail images are arranged in Step S405, and to supply them to the display part 129 to display the event calendar on the display screen of the display part 129 (Step S406).

Moreover, in the process step in Step S406, for example, such processes are included as well: the process of display in a list in the case in which a plurality of thumbnail images is arranged on the same day, and the process of displaying the image in normal size in accordance with the specified still image corresponding to the thumbnail image data.

Moreover, here, event information is used as identification information to identify and extract the target contents, which is not restricted thereto. For example, such a scheme may be possible in which various items of information, such as place names, people's names, trade manes, locations, and color, possibly included in comment data added to still image data are used as identification information and a calendar is created in which indication information of still image data added with comment data including the identification information is displayed.

8. Implementation of Software (Program) According to an Embodiment of the Invention As discussed above, the functions of the calendar frame generating part 125, the display date identifying part 126, the content extracting part 127, and the display processing part 128 depicted by a double line in FIG. 1 can be implemented by a program operated in the control part 100. To this end, a program according to an embodiment of the invention can be implemented by creating a program allowing a computer to execute program steps, the computer provided in a content display apparatus in which for contents stored and held in a storage unit, indication information of each of contents is decompressed in a calendar and displayed on a display device, the program including the steps of: accepting an instruction input to create a target calendar through an accepting unit; extracting a content that indication information has to be displayed in an elapsed period having already passed and a content that indication information has to be displayed in a non-elapsed period to pass from now on in the target calendar based on the instruction input accepted through the accepting step; and arranging the indication information of each of the contents extracted in the extracting step in a corresponding date in a target calendar and displaying the target calendar on a display device.

More specifically, a program that executes the processes discussed with reference to FIGS. 6, 7, and 12 is created, whereby a content display program according to an embodiment of the invention can be implemented. Then, in the case in which this content display program is created, the program is mounted on various information processing apparatuses having a manipulating part and a display device, whereby a content display apparatus according to an embodiment of the invention can be implemented.

In addition, such a scheme may be possible in which a recording medium is provided on which the content display program is recorded, such as a CD-ROM and a memory card, the program is read by a recording medium reading device (not shown) provided in the recording medium reading device connected to the external I/F 122 of the content display apparatus shown in FIG. 1, or the content display apparatus, and the function is implemented by the control part 100.

9. Others

Moreover, in the embodiment discussed above, the example is taken and described in which the thumbnail image of still image data of a subject taken by a digital still camera is mainly displayed as included in a calendar, but the contents are not restricted to still image data. Various contents can be target contents to be displayed in accordance with indication information, including moving image data, music data, audio data, programs, and graphic data.

Therefore, date information added to contents is not restricted to the case of using taken dates, and various items of date information added to the contents such as acquired dates, sales dates, and update dates can be used as information to identify display date information. In addition, in the case in which various contents are mixed, different items of date information can be used as a predetermined item of date information for each of the types of the contents, such as the taken date for still image data, the sales date for music data, and the created date for a program.

In addition, as discussed above, indication information of the contents is not restricted to the thumbnail image, and various forms of indication information can be used such as an icon, text information, and a mark.

In addition, the content display apparatus according to the embodiment described above is discussed as the apparatus is implemented by a personal computer, for example, which is not restricted thereto. An embodiment of the invention can be adapted to various personal information processing terminals such as a portable information terminal called a PDA (Personal Digital Assistants), an electronic organizer, a mobile telephone terminal, and a game machine.

It should be understood by those skilled in the art that various modifications, combinations, sub-combinations and alterations may occur depending on design requirements and other factors insofar as they are within the scope of the appended claims or the equivalents thereof.

What is claimed is:

1. A content display method comprising:
   accepting an instruction input to create a target calendar;
   extracting a first content that indicates first information has to be displayed in an elapsed period having already passed and a second content that indicates second information has to be displayed in a non-elapsed period in the target calendar based on the instruction input accepted through the accepting step; and
   arranging the information of each of the first and second contents in a corresponding date in a target calendar and displaying the target calendar on a display device.

2. The content display method according to claim 1,
   wherein when indication information of a plurality of contents is allocated on the same date in a calendar to be displayed, the method comprises an act of controlling display in which the contents are in turn switched and displayed.

3. The content display method according to claim 1,
   wherein when indication information of a plurality of contents is allocated on the same date in a calendar to be displayed, the method comprises an act of controlling display in which the contents are displayed in a list.

4. The content display method according to claim 1,
   wherein in the act of accepting,
   in order to create a calendar for a target period, an input of information to specify the period is accepted as the instruction input,
   in the act of extracting,
   for each of a plurality of contents stored and held, when a predetermined item of date information owned by one of the plurality of content belongs within the calendar for the target period, the date information is identified as display date information, whereas when the predetermined item of date information does not belong within the calendar for the target period, a predetermined computation, using the date information, generates the display date information, and based on the display date information, a selected content having display date information belonging within the calendar for the target period is extracted, and
   in the act of displaying,
   based on the display date information about each of the first and second contents extracted in the extracting step, indication information of each of the contents is arranged in the calendar for the target period.

5. The content display method according to claim 4,
   wherein in the act of extracting, when the predetermined item of date information owned by a content does not belong within the calendar for the target period, a first date after a first predetermined period with reference to the date information or a second date before a second predetermined period with reference to the date information is identified as the display date information.

6. The content display method according to claim 4,
   wherein in the act of extracting, when the predetermined item of date information owned by a content does not belong within the calendar for the target period, a first date after a predetermined period with reference to the date information or a second date that is near that date and on the same day of the week as the date indicated by the date information is the display date information, or a third date before a predetermined period with reference to the date information or a fourth date that is near that date and on the same day of the week as the date indicated by the date information is the display date information.

7. The content display method according to claim 4,
   wherein in the act of displaying, display forms are varied at least in indication information of a content using the predetermined item of date information owned by a particular content as the display date information and in indication information of a particular content using date information as the display date information generated by computation.

8. The content display method according to claim 1,
   wherein in the act of accepting, an input of identification information to identify a content that indication information has to be displayed in a calendar is accepted as the instruction input,
   in the act of extracting,
   a selected content having the identification information accepted in the accepting step is extracted from contents stored and held, and
   in the act of displaying,
   based on a predetermined item of date information about each of the contents extracted in the extracting step, a calendar for a target period is identified,
   for each of the contents extracted in the extracting step, when the predetermined item of date information owned by the selected content belongs within the calendar for the target period, the date information is identified as display date information, whereas when the predetermined item of date information owned by the selected content does not belong within the calendar for the target period, a predetermined computation, using the date information, generates the display date information, and
   based on the identified display date information about each of the extracted contents, indication information of each of the first and second contents is arranged in the calendar for the target period.

9. The content display method according to claim 8,
   wherein in the act of displaying, when the predetermined item of date information owned by a particular content does not belong within the calendar for the target period, a first date after a predetermined period with reference to the date information or a second date before the predetermined period with reference to the date information is identified as the display date information.

10. The content display method according to claim 8, wherein in the act of displaying, when the predetermined item of date information owned by a particular content does not belong within the calendar for the target period, a first date after a predetermined period with reference to the date information or a second date that is near that date and on the same day of the week as the date indicated by the date information is the display date information, or a third date before the predetermined period with reference to the date information or a fourth date that is near that date and on the same day of the week as the date indicated by the date information is the display date information.

\* \* \* \* \*